United States Patent Office 3,824,131
Patented July 16, 1974

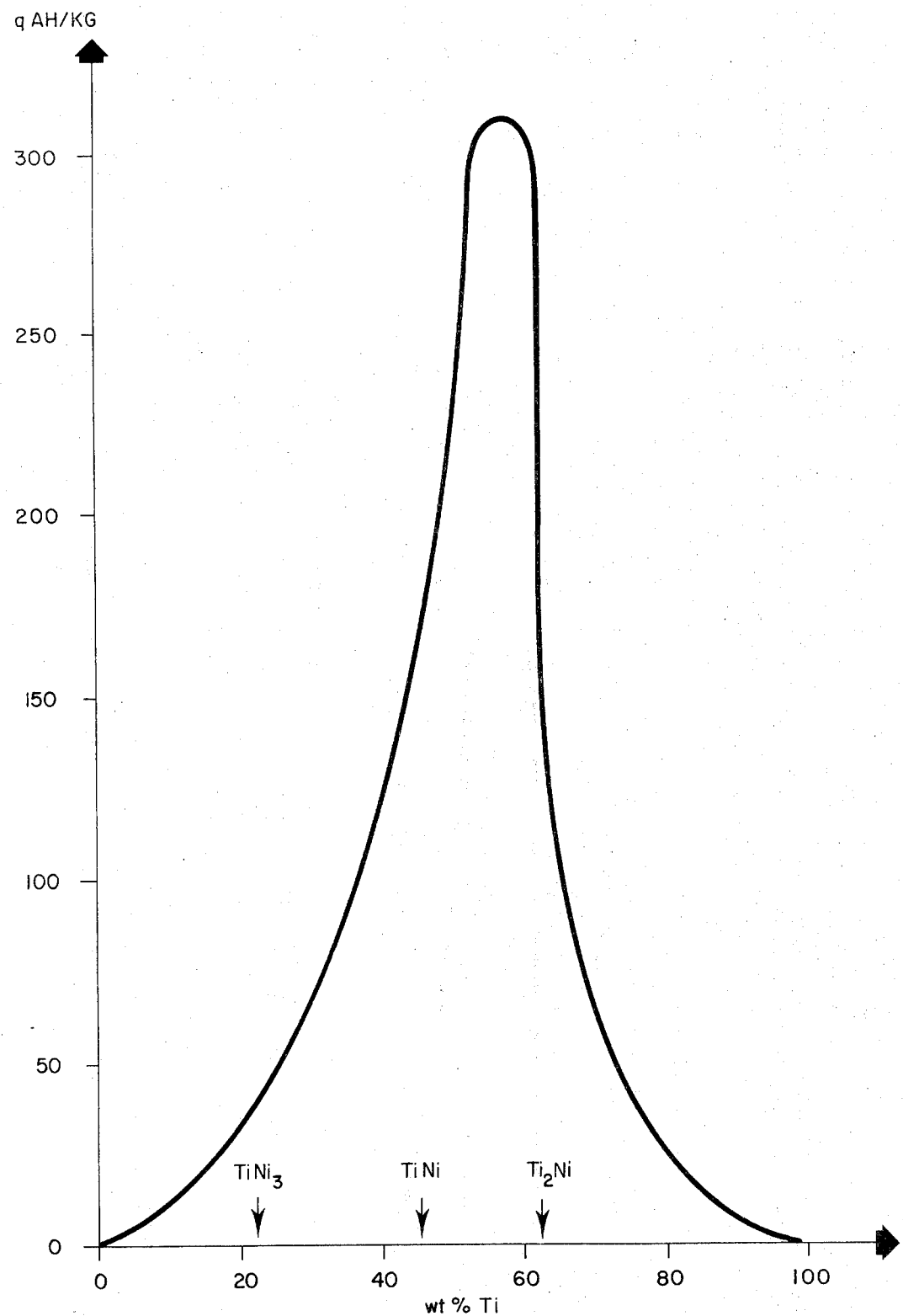

3,824,131
NEGATIVE ELECTRODE OF TITANIUM-NICKEL ALLOY HYDRIDE PHASES
Klaus Beccu, 46 Chemin Sous-le-Cret, Troinex, Geneva, Switzerland
Continuation-in-part of application Ser. No. 29,740, Apr. 24, 1970, now Patent No. 3,669,745, which is a continuation of abandoned application Ser. No. 726,234, May 2, 1968. This application Apr. 6, 1972, Ser. No. 241,525
Int. Cl. H01m 35/02
U.S. Cl. 136—20
7 Claims

ABSTRACT OF THE DISCLOSURE

An improved negative electrode in an electrochemical energy storage cell for generating electric current, comprising the negative electrode, an alkaline electrolyte and a positive oxygen or oxide electrode. The negative electrode comprises a porous body with a current conducting support and an active component providing reversible hydride formation by electrochemical charge and discharge. The active component consists essentially of two coexistent alloy hydride phases in mutual contact along extensive phase boundaries throughout the component. Both phases have a lattice structure formed essentially from the titanium-nickel system, one phase having a body-centered cubic structure and the other a face-centered cubic structure. Improved electrochemical discharge and recharge is provided by hydrogen transfer between the two phases.

---

This application is a continuation-in-part of my earlier co-pending application, Ser. No. 29,740, filed Apr. 24, 1970 now U.S. Pat. No. 3,669,745, which is a streamlined continuation of Ser. No. 726,234 filed May 2, 1968 now abandoned.

The invention relates to the field of storage systems for electric energy and particularly to a negative electrode for use in storage cells for the generation of electric energy by electrochemical reaction of oxygen and hydrogen, the latter being stored in the negative electrode.

In my prior pending U.S. patent application identified above, there has been disclosed an alkaline accumulator having a negative hydrogen-storage electrode comprising an electrochemically active component forming between 40 and 70% by weight of the electrode body. The active component consists of a hydride of at least one transition metal of Groups III, IV and V, alloyed with a least one additional metal selected from the group consisting of Ni, Cu, Ag, Fe and Cr-Ni-steel, said additional metal is diffused into the metallic hydride, the hydrogen being bound interstitially in the hydride and a current-conducting support being embedded in the electrode body. This active component allows high reversible, electrochemical hydrogen storage and thus provides a high specific energy storage capacity.

The present invention is directed to improvements with a view to ensuring a high energy storage capacity while fulfilling various requirements with regard to load characteristics and electrode lifetime, according to the intended use of the storage cell.

Thus, one object of the invention is to provide for maximum storage capacity with repeated, high current discharge of relatively short duration, as is required in starter (SLI) batteries for example. Another object is to ensure a high storage capacity with often repeated charge/discharge cycles.

The present invention provides for a negative electrode for use in an energy storage cell comprising an alkaline electrolyte and a positive oxygen or oxide electrode, said negative electrode comprising a porous electrode body with a current-conducting support and an active component providing reversible hydride formation by electrochemical charge and discharge, wherein said active component consists essentially of two coexistent alloy hydride phases each having a lattice structure formed essentially from the titanium-nickel system, one of said two phases having a body-centered cubic structure, the other phase having a face-centered cubic structure, and both said phases being in mutual contact along phase boundaries, extending throughout said component, whereby to provide improved electrochemical discharge and recharge by hydrogen transfer between the said two phases.

This improved electrode is of the general type disclosed in my copending application, with titanium and nickel as the main constituents of the active component. According to the phase diagram of the Ti-Ni alloy system, the two phases TiNi and Ti$_2$Ni are coexistent over a major portion of the composition range with a titanium content of 40 to 70% by weight. These phases respectively have a body-centered and face-centered crystal structure and their coexistence, with extensive common phase boundaries throughout the active component, has been found to provide a particular result, especially with regard to improved hydrogen transfer during electrochemical discharge and recharge in a storage cell.

For a further understanding of the present invention, reference is made to the single figure of the drawing.

This figure shows an experimental curve giving measured values of the specific energy storage capacity ($q$ a.h./kg.) as a function of the composition of the fully hydrogenated Ti-Ni alloy system when it is used as the electrochemically active component in a negative electrode of a storage cell.

This curve was obtained with electrode samples having an active component with a composition covering the whole range from 0 to 100% Ti and the specific capacity $q$ of each electrode was measured by cycling in a conventional half-cell test arrangement, using 6 N KOH as electrolyte.

The electrode samples were prepared in the following manner: For each sample, a mixture of titanium hydride powder and nickel powder was first prepared. The composition of the sample mixtures was made to vary by steps of 5 wt. percent in the amount of titanium-hydride so as to cover the whole composition range of Ti-Ni alloys.

Each powder mixture was sintered at 800–850° C. under vacuum (10$^{-6}$ Torr) and then slowly cooled down to ambient temperature in the presence of hydrogen with a high degree of purity, so as to obtain a sintered body consisting of fully hydrogentated Ti-Ni alloy. This body was then crushed and screened, under hydrogen, to a particle size less than 33$\mu$.

The alloy hydride powder thus obtained was then used to form the electrode sample by mixing with copper powder in a ratio of about 3:2 parts by weight, cold-pressing in a mould, then hot-pressing at about 600° C. at 3 tons/cm.$^2$, in an inert gas atmosphere (argon) for about 3 minutes and subsequent cooling, under argon, so as to obtain a porous, disc-shaped electrode sample comprising about one gram of the said alloy hydride.

When determining the specific capacity in the half-cell test arrangement, discharge was measured under galvanostatic conditions with a current flow of 50 ma. between the negative electrode sample and a positive nickel counter-electrode, while the discharge was terminated when the sample electrode reached the limit of its useful potential, namely at a switch-off potential of −700 mv. with respect to a Hg/HgO reference electrode. The potential of the fully charged electrode was −980 mv. with reference to Hg/HgO.

The specific storage capacity $q$ was determined in each case from the product of the constant discharge current and the measured discharge time, divided by the weight of alloy hydride powder in the electrode sample.

This experimental curve gives the averaged values of $q$ for a large number of samples and for several discharge/recharge cycles. These values thus represent the energy which may be stored in, and restituted by, the electrode samples during reversible electrochemical charge and discharge in an alkaline electrolyte.

It may be readily seen that these experimental values for reversible electrochemical energy storage in alloy hyhydrides cannot be correlated with the maximum hydrogen-uptake from the gas phase, of the metals used in the alloys.

Indeed, it is a well known fact that the titanium lattice can take up a very great amount of hydrogen (about 460 N cc. per gram) whereas nickel has a practically negligible capacity for storing hydrogen. Hence one might expect that the titanium content is the determining factor for electrochemical hydrogen storage in a titanium-nickel alloy.

However, the bell-shaped experimental curve shows that the energy storage capacity $q$, which evidently depends on the amount of hydrogen which can be reversibly stored and restituted by electrochemical charge and discharge, shows no obvious relationship to the titanium content of the alloy.

Indeed, as is seen from this curve, after reaching a peak value of about 300 a.h./kg., the effective specific capacity $q$, in the useful potential test range between about —980 and —700 mv. with reference to the Hg/HgO electrode, rapidly decreases with increasing titanium content and finally tends to zero at 100% Ti.

According to the phase diagram for the Ti-Ni system, the alloy phase TiNi, which has a $B_2$-type body-centered cubic structure, occurs at 45 wt. percent Ti while the alloy phase $Ti_2Ni$, which has a $E9_3$-type face-centered cubic structure, occurs at 62–65 wt. percent Ti.

The range of coexistence of these two phases extends between 45 wt. percent Ti and 65 wt. percent Ti and, as may be readily seen from the experimental curve, the specific energy storage capacity increases steeply as the titanium content rises above 45 wt. percent (TiNi phase), reaches a peak value at about 57 wt. percent-Ti, and then falls steeply once more as the titanium content increases to 62–65 wt. percent ($Ti_2Ni$ phase).

In other words, the peak value of the storage capacity $q$ lies roughly in the middle of the said range of coexistence of the TiNi and $Ti_2Ni$ phases, while $q$ has values of only about one half of this peak value at the limits of this range, i.e. when only one of the said phases is present, and gradually falls to zero outside these limits, i.e. as the titanium content tends to 0% and 100% respectively. The latter result at 100% Ti is most unexpected in view of the above explanations and clearly demonstrates that pure titanium has no useful electrochemical energy storage capacity and that the titanium content, per se, is not as significant as might have been expected on the basis of the high ability of titanium to take up hydrogen from the gas phase. Indeed, it may be noted in this respect, that the value of $q$ is roughly the same at both ends of said range, i.e. for alloys which are richer in nickel on one hand and in titanium on the other.

Investigation of the structure of the electrode samples has clearly shown that, in the said range between 45 and 65 wt. percent Ti, the TiNi and $Ti_2Ni$ phases are both present and are in mutual contact along common phase boundaries throughout the alloy hydride particles which form the electrochemically active component of the porous, sintered electrode samples.

In view of the unexpectedly high storage capacities which were achieved in the said range of coexistence of the TiNi and $Ti_2Ni$ phases, a phenomena of interaction between these phases apparently occurs during electrochemical discharge and recharge of the electrode samples.

This interaction was investigated and could be experimentally verified as is explained below.

The process of electrochemical hydrogenation and dehydrogenation of the alloy phases $Ti_2Ni$ and TiNi was investigated. Tests were carried out with three sets of electrode samples obtained as described, wherein the active component was formed by sintering powder mixtures with different ratios by weight of $TiH_2$/Ni, namely: 50/50; 57/43 and 62.5/37.5.

Diffractometric measurements showed that the fully hydrogenated active component of all the samples is composed of the two alloy hydride phases $Ti_2NiH_{2.5}$ and TiNiH.

In the course of electrochemical dehydrogenation, the following phases were found to be present in various combinations depending on the composition of the active component: $Ti_2NiH_2$, $Ti_2NiH$; $Ti_2NiH_{0.5}$; TiNiH and TiNi. Thus, for example, in the case of electrode samples with the above-mentioned 57–43 mixture composition, the following charge/discharge behaviour was determined in the binary phase mixture forming the active component:

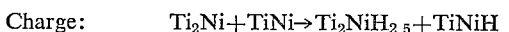

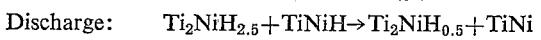

Investigation of the individual phases, i.e. of each of the phases in the absence of the other, showed that TiNi can be electrochemically charged and discharged in a fully reversible manner whereas the $Ti_2Ni$ phase alone can only be electrochemically charged to the hydride phase $Ti_2NiH_2$ and discharged to $Ti_2NiH$.

It may thus be seen that the simultaneous presence of both the $Ti_2Ni$ and TiNi phases in close contact in the active component, leads to a significant change in the behaviour of the $Ti_2Ni$ phase during electrochemical charge and discharge.

This interaction of the phase could also be clearly demonstrated by capacity measurements, using the half-cell arrangement as described above. Thus, electrode samples with only the $Ti_2Ni$ phase in the active component provide a measured specific capacity of only 150 a.h./kg., whereas samples having binary phase mixtures as the active component consistently provide higher measured specific capacities with a peak value of about 300 a.h./kg. at a composition with about 57 wt. percent Ti. The decrease of the specific capacity $q$ as the titanium content of the active component increases beyond 57 wt. percent, clearly shows that an interaction between the coexistent TiNi and $Ti_2Ni$ phases, rather than the titanium content, per se, of the active component, is the critical factor with regard to high reversible, electrochemical energy storage.

It may be noted that the measured peak values of the specific capacities correspond, within a small margin of error, to the theoretical values calculated on the basis of the composition and the observed charge/discharge behaviour of the phase mixture, as described above.

This may be illustrated by considering the electrode samples having an active component prepared from a powder mixture with 57% $TiH_2$/43% Ni by weight, which provides, after sintering, a phase mixture with 63% $Ti_2Ni$ and 37% TiNi.

The theoretical specific capacity available between $Ti_2NiH_{2.5}$ and $Ti_2NiH_{0.5}$ is equal to 430—85=345 a.h./kg., while that available between TiNiH and TiNi is 250 a.h./kg.

Hence, the theoretically calculated specific capacity of the said phase mixture may be given as follows:

$$0.63 \times 345 + 0.37 \times 250 = 314 \text{ a.h./kg.}$$

The measured values of $q$ obtained with a great number of electrode samples prepared from the above-mentioned 57/43 powder mixture were in excellent agreement with this estimated figure, the mean value of $q$ being about 310 a.h./kg.

It may thus be seen that a most significant electrochemical energy storage effect is achieved in the Ti-Ni-H system when the active component is a binary phase mixture comprising one alloy hydride phase with a body-centered cubic structure of the TiNi type (i.e. $B_2$) and the other alloy hydride phase with a face-centered cubic structure of the Ti$_2$Ni type (i.e. $E9_3$).

The sharp rise of the electrode capacity within the co-existence range of these phases is apparently due to phase interaction which is of critical significance with regard to hydrogen transfer during electrochemical hydrogenation and dehydrogenation. In this interaction, the TiNi-type phase apparently also provides a significant catalytic effect which ensures maximum transfer of hydrogen to and from the Ti$_2$Ni-type phase. This phase interaction thus provides greatly improved reversible electrochemical energy storage with a specific capacity which is substantially higher than that of either of said phases alone.

The above-mentioned samples were prepared in the laboratory under the strictest conditions, especially with regard to purity of the metals. The use of titanium hydride (TiH$_2$), as described, has the advantage that this material is commercially available at reasonable cost and moreover is well suited for providing pure titanium for alloying with nickel during the sintering step. Although the choice of the exact sintering temperature is not critical, temperatures below 900° C. are preferred, since melting of the Ti$_2$Ni phase (at 984° C.) must be avoided in order to ensure formation of the desired binary phase mixture.

It may be noted, however, that titanium hydride is dehydrogenated during the sintering step and that the hydrogen necessary for forming the hydrides of the alloy phases is incorporated in the alloy lattices during subsequent cooling under hydrogen. It may thus be seen that the use of titanium in hydride form is not indispensable for forming the desired alloy hydride phases. The use of comminuted titanium sponge may thus also be contemplated, for example, for preparing the active component.

It may further be noted that the active component of the said electrode samples was consistently prepared in the laboratory under high vacuum, during sintering, and in the presence of hydrogen during subsequent cooling.

It has been found, however, that when the active component is prepared under less strict conditions, the lattice of the alloy hydride phases may contain a certain amount of oxygen.

An investigation of the lattice structure showed that oxygen incorporated in the alloy hydride phases modifies the lattice changes during cycling. Moreover, electrochemical tests have further shown that this modication may substantially influence the cycling behavior of the electrodes.

The measured increase of the lattice-parameter during hydrogenation of the oxygen-free phases is 0.6 A. for the Ti$_2$Ni phase and 0.3 A. for the TiNi phase.

However, when oxygen was present in a concentration of about 1.5% by weight in the phase lattices of the active component, it was found that the increase of the lattice parameter of the Ti$_2$Ni phase may amount to 0.35 A., so that the difference between the lattice expansions of the two phases is substantially reduced. Various cycling tests with samples having different oxygen content in the alloy phases have clearly shown that the electrode lifetime during cycling is substantially improved as the oxygen content of the active component is increased up to the said value of about 1.5% by weight.

The said investigation and cycling test have shown that a substantial storage effect and high cycling life may be achieved when the said binary phase mixture of the active component of the electrode has an oxygen content preferably of about 6 at. percent.

The above-mentioned investigations were further extended to various ternary intermetallic systems formed mainly from the Ti-Ni system and further including an additional metal as a substitute for a small part of the titanium or nickel content in both phases of the active component. It was found that certain such ternary systems provide an active component consisting of a similar binary phase mixture having the same two types of alloy hydride phases with body-centered and face-centered cubic structures respectively.

Electrochemical tests moreover showed that similar results could be obtained with regard to reversible hydride formation in the active component obtained from such ternary systems.

Thus, for example, up to 25 atom percent of the titanium content of each phase of the active component may be replaced by zirconium or chromium. The corresponding maximum content of the metal substitute in the active component would then be 25 wt. percent for zirconium and 10 wt. percent for chromium.

It was found that such substitutions can provide further improvement of the specific capacity $q$ of the active component.

Moreover, up to 25 atom percent of the nickel content of both phases of the active component may be replaced by copper, cobalt or iron and it was found that such substitutions can provide improvement of the electrode lifetime, which may be due to higher overall ductility of the active component. The corresponding content by weight of the substitute in the active component would then be about 10 wt. percent for Cu as well as Co and Fe.

It may thus be seen that the said two existent alloy hydride phases, which constitute the active component of the electrode according to the present invention, must be mainly formed from or determined by the Ti-Ni system, but need not contain these two metals exclusively. The invention further relates to a method of manufacturing a negative electrode providing reversible electrochemical hydride formation in an energy storage cell for generating electric current.

This method comprises the steps of:

preparing a homogeneous powder mixture comprising two metallic constiuents, at least a major part of one of the said constituents consisting of titanium and said one constituent forming between 45% and 65% by weight of the said mixture, and at least a major part of the other of the said two constituents consisting of nickel;

subjecting the said powder mixture to prolong sintering so as to provide complete interdiffusion of the said constituents and formation of two given alloy phases of said constituents, said phases being in mutual contact throughout the sintered mixture; and forming a porous electrode of desired shape, during or after said sintering, said body comprising an electrochemically active component formed of said two alloy phases and further including a current-conducting support within said electrode body.

In this method, the use of a powder mixture wherein said one constituent forms between 45% and 65% by weight of the mixture, as well as prolonged sintering of this mixture, ensure formation of the desired binary mixture for providing the electrochemically active component of the electrode. After sintering, the alloy body may be cooled down gradually in a hydrogen atmosphere so as to provide complete hydrogenation of the said alloy phases and transformation thereof to corresponding alloy hydride phases.

The said support material may be any suitable, electrochemically inactive conductor such as copper or nickel, for example. The amount of support material used in the electrode body should be reduced as far as possible and should preferably not exceed 20% by weight of the electrode, in order to provide a high specific capacity per unit weight of the whole electrode.

The electrode body may be formed by sintering under pressure (hot-pressing) or in any other suitable manner of bonding the active material to the support material.

A current-conducting inert network, of copper wire for example, may further be embedded in the electrode body in order to provide improved current conduction and mechanical support. When the electrode is shaped during the said sintering step for forming the alloy phases, an inert current-conducting network, e.g. in the form of a titanium wire grid which has been superficially borided by a gas-phase process may be used as a support for the electrode body.

The invention also relates to an energy storage cell for generating electric current, having a negative electrode, an alkaline electrolyte and a positive oxygen or oxide electrode, said negative electrode comprising a porous electrode body with a current-conducting support and an active component providing reversible hydride formation by electrochemical charge and discharge wherein: said active component consists essentially of two coexistent alloy hydride phases each having a lattice structure formed essentially from the titanium-nickel system, one of the said two phases having a body-centered cubic structure, the other phase having a face-centered cubic structure, and both said phases being in mutual contact along phase boundaries extending throughout said component, whereby to provide improved electrochemical discharge and recharge by hydrogen transfer between the said two phases.

The following examples illustrate the manufacture of electrodes according to the present invention.

EXAMPLE 1

(A) Preparation of the active material (i) Titanium hydride ($TiH_2$) powder and nickel powder are mixed together so as to obtain a homogeneous powder mixture composed of 57 wt. percent $TiH_2$ and 43 wt. percent Ni.

(ii) The powder mixture is next subjected to cold pressing at ambient temperature and under a pressure of 2 tons/cm.$^2$ so as to form a pressed porous body.

(iii) This body is slowly heated up to 850° C. under vacuum ($10^{-5}$ Torr), then subjected to a sintering step (at 850° C.) in a hydrogen atmosphere, for 24 hours, so as to provide a porous sintered body which is finally slowly cooled down in a hydrogen atmosphere, so as to gradually reach ambient temperature in about 12 hours.

(iv) The sintered body is finally comminuted in an inert gas atmosphere (argon) and screened down to a particle size of less than 33$\mu$. The active material is thus obtained in the form of a powder material for subsequently forming an electrode of desired shape.

(B) Manufacture of the electrode body (i) The active material powder with a particle size less than 33$\mu$ is mixed in a ratio of 4:1 parts by weight with fine copper powder (<33$\mu$) which serves to provide a current conductor and support for the electrode body. The copper in the mixture moreover provides a standard which allows precise analysis of the alloy hydride phases forming the particles of active material. X-ray analysis shows these particles to be formed of 70 wt. percent $Ti_2NiH_{2.5}$ and 30 wt. percent TiNiH, no traces of titanium hydride being present in the particles.

(ii) After thus checking the active material as to the desired composition, the active powder is placed in a die and a network of fine copper wires (0.1 mm. diam.) is embedded therein so that the ends of the copper wires protrude. A hot-pressing step is next carried out for three minutes, at a temperature of 400° C. and a pressure of 8 tons/cm.$^2$ so as to obtain a porous electrode body of rectangular shape (3.5 x 4 cm.) with a thickness of 1–2 mm. The protruding ends of the copper wires are then interconnected by means of a thin copper wire conductor. The electrode body is finally clamped between two conventional plastic separator plates in order to avoid deformation thereof due to volume changes during operation. The electrode is now ready for use.

(C) Test performance 50 electrode specimens which were obtained as described above, were tested in a standard electrochemical half-cell arrangement with a Hg/HgO reference electrode and a nickel counter-electrode.

The electrochemical tests were effected in 6 N KOH with a charge and discharge current of 50 ma./per gram of active material. Discharge was effected at a potential between —980 mv. and —740 mv. with respect to Hg/HgO. The electrodes were overcharged to 110% of the nominal capacity in all these tests.

The 50 electrodes tested under the above-mentioned conditions had specific capacity having an average value of 250 a.h./kg. with a gradual capacity drop of about 50% after 100 charge/discharge cycles.

Such electrodes, of which several may be readily assembled to provide larger electrodes of any desired size, are suitable for use as negative electrodes in starter (SLI) batteries to provide improved performance over a very broad range of operating temperatures, with a considerably higher capacity and performance than conventional lead batteries.

EXAMPLE 2

A powder mixture composed of 50 wt. percent $TiH_2$ and 50 wt. percent Ni is used to prepare the active material and manufacture several electrodes using the same series of steps described in Example 1 under (A) and (B). According to the phase diagram, the active component is composed, in this case, of about 30 wt. percent $Ti_2NiH_{2.5}$ and 70 wt. percent TiNiH.

Cycling tests effected under the same conditions as in Example 1 provided specific capacities having an average value of 200 a.h./kg. After 100 and 150 charge/discharge cycles, the capacity drop amounted to about 30 and 50%, respectively of the initial value. This improved cycling behaviour may be explained by the higher proportion of the TiNiH phase, with respect to the electrode samples of Example 1.

EXAMPLE 3

Electrodes are prepared as described in Example 1. However, copper is used as a substitute for 10 at. percent of the nickel content of the said phases of the active material comprising 70 wt. percent $Ti_2NiH_{2.5}$ and 30 wt. percent TiNiH. The powder mixture used for preparing the active component in this case comprises $TiH_2$, Ni and Cu in a ratio of 57:39:4 parts by weight.

Cycling tests effected under the same conditions as in Example 1 provided specific capacities having an average initial value of 200 a.h./kg. with a gradual capacity drop to 150 a.h./kg. after 120 charge/discharge cycles. This slight substitution of nickel by copper in the active component thus provides improved cycling performance, which may be due to improved resistance to corrosion.

EXAMPLE 4

Electrode samples similar to those of Example 3, but wherein a similar amount of cobalt is used, instead of copper, to partially substitute nickel, provide substantially the same performance as indicated in Example 3.

EXAMPLE 5

Electrodes are prepared as in Example 2, but with inclusion of copper as a substitute for 5 at. percent of the nickel content of the alloy hydride phases forming the active component. The powder mixture used for preparing the active component in this case comprises $TiH_2$, Ni and Cu in a ratio of 52:47:3 parts by weight.

Cycling tests carried out as in Example 1, by with use of 2 N KOH instead of 6 N KOH as the electrolyte, provided an initial specific capacity of about 180 a.h./kg. with a gradual drop to 160 a.h./kg. (about 90% of the initial value) after 110 charge/discharge cycles.

EXAMPLE 6

When the electrodes used in Example 5 are subjected to the cycling tests as in Example 1, but with 6 N KOH and with a discharge depth of about 80–85% of the nominal capacity, a specific capacity of 170 a.h./kg. is achieved with no capacity loss up to 80 charge/discharge cycles. A useful electrode lifetime of 300 cycles may thus be expected.

EXAMPLE 7

Electrodes are prepared as in Example 1, but with use of zirconium as a substitute for 10 at. percent of the titanium content of the alloy hydride phases. The powder mixture used for preparing the active component comprises in this case $TiH_2$, Ni and Zr in a ratio of 50:42:10 parts by weight.

Cycling tests carried out on several test specimens, under the conditions described in Example 1, provided an initial specific capacity with an average value of 270 a.h./kg. with a gradual capacity drop reaching 50% after 60 cycles.

EXAMPLE 8

Electrode samples are prepared as in Example 1, but with use of chromium as a substitute for 20 at. percent of the titanium content of the alloy hydride phases. The powder mixture used for preparing the active component comprises in this case $TiH_2$, Ni and Cr in a ratio of 46:44:12 parts by weight.

Cycling tests carried out under the same conditions as in Example 1 provided an average initial specific capacity of 190 a.h./kg. with a gradual decrease to 140 a.h./kg. after 140 charge/discharge cycles.

EXAMPLE 9

Titanium hydride powder and nickel powder are mixed together so as to obtain a homogeneous powder mixture having a composition by weight of 57 wt. percent $TiH_2$ and 43 wt. percent Ni, the particle size of both constituents being less than $33\mu$.

This powder mixture is pressed in a die, together with a suitable inert current-conducting supporting network, e.g. grid of titanium wire which has been superficially borided, embedded therein, then subjected for 24 hours to sintering at 850° C. under vacuum ($10^{-5}$ Torr), so as to obtain a porous sintered electrode body of desired shape, said body finally being gradually cooled down to ambient temperature, in a hydrogen atmosphere.

A negative electrode of the desired shape is thus obtained, which consists of a porous sintered mass having the said supporting framework embedded therein; said mass is composed of sintered particles consisting of $Ti_2NiH_{2.5}$ and TiNiH, the ratio of these alloy hydride phases being 70:30 parts by weight of the sintered mass.

The specific capacity of this electrode is about 250 a.h. per kilogram of the alloy hydride particles, the cycling performance being substantially the same as that of the electrodes of Example 1.

From the above examples, it may be seen that certain metals may be used to partially substitute the titanium or nickel content of the alloy hydride phases, while obtaining the same types of phase lattice structures in the active component, in order to provide improvement of the electrode performance. Simultaneous partial substitution of both titanium and nickel by the above-mentioned metals may likewise contemplated.

It may be seen, with reference to the foregoing examples and to the above discussion of the experimental curve, that the electrode capacity and cycle life which are achieved depend to a certain extent on the conditions used when forming the electrode body. Thus, for example, increase of the pressure and temperature used during hot-pressure leads to somewhat lower effective capacities, whereas the cycle life may be notably increased. Conversely, when the electrode body is hot-pressed at a relatively low pressure and temperature, a higher capacity may be achieved, whereas the cycle life is reduced.

The electrode body may be formed at pressures ranging between 0.5 and 25 tons/cm.$^2$ and temperatures ranging between ambient temperature and 700° C., the chosen pressure and temperature being dependent on the desired electrode size and performance.

However, as was already mentioned, any other suitable manner of bonding the active material to the support material may be contemplated for forming the electrode body, for example by using a suitable binder.

I claim:

1. A negative electrode for alkaline energy storage cells, comprising an electrochemically active material providing reversible hydride formation during electrochemical charge and discharge, wherein:

Said active material consists essentially of a binary phase mixture which, in the charge state, is composed of two alloy hydride phases each having a lattice structure formed essentially from the titanium-nickel alloy system, which phases are coexistent side-by-side and in mutual contact along common phase boundaries extending throughout the said material; and said active material comprising a first metallic component consisting of titanium or formed mainly thereof and a second metallic component consisting of nickel or formed mainly thereof, said two coexistent alloy hydride phases each being formed essentially of said components, one phase having an alloy lattice of the TiNi type with a body-centered cubic structure and the other phase having a lattice of the $Ti_2Ni$ type with a face-centered cubic structure.

2. The electrode of claim 1, wherein said alloy phases comprise, in addition to titanium and nickel, at least one substitute metal present in an atomic ratio of at most 1:3 with respect to the titanium or nickel content of the said phases.

3. The electrode of claim 2, wherein said substitute metal is selected respectively from the group consisting of zirconium and chromium, as a partial substitute for titanium, and from the group consisting of copper, cobalt and iron, as a partial substitute for nickel.

4. The electrode of claim 1 wherein the said active material comprises the said first and second metallic components in an atomic ratio in the range between 1:1 and 2:1.

5. The electrode of claim 1 comprising a porous electrode body with an electrochemically inert, electrically conductive support material embedded at least partially in a porous mass of said active material.

6. The electrode of claim 5 comprising a gridlike support network of said inert material embedded in a porous sintered mass of said active material.

7. The electrode of claim 5 wherein said active material comprises about 57% by weight of said first component and about 43% by weight of said second component.

References Cited

UNITED STATES PATENTS

| | | | |
|---|---|---|---|
| 3,620,844 | 11/1971 | Wicke | 136—120 FC |
| 3,382,106 | 5/1968 | Jung et al. | 136—120 FC |
| 3,669,745 | 6/1972 | Beccu | 136—20 |
| 3,207,600 | 9/1965 | Hirai et al. | 136—86 D |
| 3,423,248 | 1/1969 | Plust | 136—120 FC |
| 3,311,508 | 3/1967 | Biddick et al. | 136—120 FC |
| 3,294,586 | 12/1966 | Le Duc | 136—120 FC |

ALLEN B. CURTIS, Primary Examiner

C. F. LEFEVOUR, Assistant Examiner

U.S. Cl. X.R.

136—86 D, 120 R

UNITED STATES PATENT AND TRADEMARK OFFICE
Certificate

Patent No. 3,824,131                                        Patented July 16, 1974

Klaus Beccu

Application having been made by Klaus Beccu, the inventor named in the patent above identified, and Battelle Memorial Institute, International Division, Geneva, Switzerland, the assignee, for the issuance of a certificate under the provisions of Title 35, Section 256, of the United States Code, adding the name of Rudolf Siegert as a joint inventor, and a showing and proof of facts satisfying the requirements of said section having been submitted, it is this 15th day of July 1975, certified that the name of the said Rudolf Siegert is hereby added to the said patent as a joint inventor with the said Klaus Beccu.

FRED W. SHERLING,
*Associate Solicitor.*